(12) United States Patent
Winter

(10) Patent No.: US 7,114,465 B1
(45) Date of Patent: Oct. 3, 2006

(54) PET OPERATED BALL THROWER

(76) Inventor: Dana S. Winter, 83405 Clear Lake Rd., Florence, OR (US) 97439

( * ) Notice: Subject to any disclaimer, the term of this patent is extended or adjusted under 35 U.S.C. 154(b) by 107 days.

(21) Appl. No.: 11/026,774

(22) Filed: Dec. 31, 2004

Related U.S. Application Data

(60) Provisional application No. 60/534,080, filed on Jan. 5, 2004.

(51) Int. Cl.
*F41B 3/03* (2006.01)
(52) U.S. Cl. .......................................... 119/707; 124/7
(58) Field of Classification Search ............... 119/702, 119/707; 124/4–7; 273/317.7
See application file for complete search history.

(56) References Cited

U.S. PATENT DOCUMENTS

| | | | | |
|---|---|---|---|---|
| 1,563,908 A | * | 12/1925 | Krause | ........................ 273/394 |
| 3,611,996 A | | 10/1971 | Wegner | |
| 3,662,728 A | * | 5/1972 | Retrum | ......................... 124/79 |
| 3,794,325 A | * | 2/1974 | Stender | ....................... 273/399 |
| 4,082,076 A | * | 4/1978 | Perry | ............................. 124/7 |
| 4,995,374 A | * | 2/1991 | Black | ........................... 124/54 |
| 5,195,499 A | * | 3/1993 | Thorne | .......................... 124/1 |
| 6,343,597 B1 | * | 2/2002 | Spikes | ........................... 124/7 |
| 6,718,961 B1 | * | 4/2004 | Woods et al. | .................. 124/7 |
| 6,778,915 B1 | * | 8/2004 | Kelly et al. | .................... 702/41 |

* cited by examiner

*Primary Examiner*—Teri Pham Luu
*Assistant Examiner*—Susan C. Alimenti
(74) *Attorney, Agent, or Firm*—Robert E. Howard

(57) ABSTRACT

A pet operated ball thrower including a base, a fulcrum post attached at its lower end to the base, a throw arm pivotally attached to the upper end of the fulcrum post, a ball receiving receptacle attached to the throw arm adjacent its outer end, a treadle pivotally attached at its lower end to the base, and an attachment member pivotally attached at its lower end to the treadle and pivotally attached at its upper end to the throw arm. A pet is trained to jump on the treadle to cause the outer end of the throw arm and attached ball receiving receptacle to be rapidly moved upwardly, thereby tossing the ball from the receptacle into the air for retrieval. The pet is trained to replace the retrieved ball into the receptacle, thereby allowing repeated tossing and retrieving of the ball by the pet.

7 Claims, 2 Drawing Sheets

PET OPERATED BALL THROWER

CROSS-REFERENCE TO RELATED APPLICATIONS

This application claims the benefit of U.S. Provisional Application No. 60/534,080, filed Jan. 5, 2004, the entire contents of which are incorporated herein.

BACKGROUND OF THE INVENTION

The present invention relates to a ball thrower that is wholly operated by a pet, such as a dog.

There are many ball retrieval games in which a human interacts with a pet. Such games can be very simple, such as a human tossing a ball into the air for a pet to try and catch, and then return the ball to the human for further tosses.

There are also devices similar to catapults in which the pet can cause the device to release a ball into the air which the pet then catches, or attempts to catch, and then returns the ball to a human who reloads the device. One such device is described in U.S. Pat. No. 3,611,996.

However, it is not believed there is a ball tossing device in which the pet not only can cause a ball to be tossed into the air, but the pet can also reload the device with the ball retrieved by it for repeated ball tosses.

SUMMARY OF THE INVENTION

It is an object of the present invention to provide a ball tossing device that can be wholly operated by a pet without human intervention or human presence.

The pet operated ball thrower of the present invention includes a base, a fulcrum post attached at its lower end to the base, a throw arm pivotally attached to the upper end of the fulcrum post, a ball receiving receptacle attached to the throw arm adjacent its outer end, a treadle pivotally attached at its lower end to the base, and an attachment member pivotally attached at its lower end to the treadle adjacent its upper end, the attachment member being pivotally attached at its upper end to the throw arm.

A pet is trained to jump on the treadle causing downward movement of its upper end which, in turn, rapidly pulls downwardly on the inner end of the throw arm to thereby cause the outer end of the throw arm and attached ball receiving receptacle to be rapidly moved upwardly thereby tossing the ball located in the receptacle into the air for catching by the pet. The pet is trained to replace the retrieved ball into the receptacle, thereby allowing repeated tossing and retrieving of the ball.

DESCRIPTION OF PREFERRED EMBODIMENTS

Figure 1:
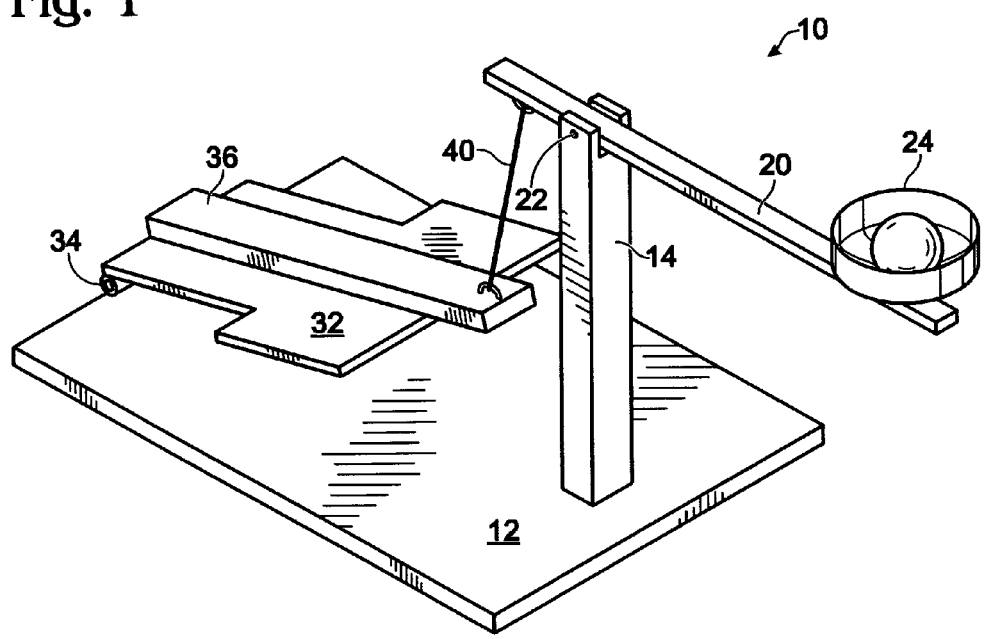
FIG. 1 is a perspective view of the pet operated ball tossing device of the present invention, shown in its ready-to-use mode.

The pet operated ball tossing device 10 includes a base platform 12, a fixed fulcrum post 14 extending vertically upward from platform 12 adjacent its rear edge, a throw arm 20, and a treadle 30.

Throw arm 20 is pivotally attached to fulcrum post 14 by pivot pin 22. Throw arm 20 has a first, short portion extending between its inner end and pivot pin 22, and a second, long portion extending between pivot pin 22 and the outer end of throw arm 20.

A ball receptacle 24 is attached to the outer end of throw arm 20. Ball receptacle 24 is closed at its bottom and is open at its upper end to allow a ball to be placed and stored therein. A funnel whose exit spout has been plugged provides a satisfactory ball receptacle. 24

Treadle 30 includes a T-shaped treadle platform 32 that is hingedly attached at its lower end to base platform 12 adjacent its front edge by any suitable hinge means 34, such as a piano hinge. A treadle extension 36 is attached to the upper planar surface of treadle platform 32 and extends beyond the upper edge thereof, as shown. Alternatively, treadle platform 32 and treadle extension 36 can be a single piece formed by injection molding, for example.

An attachment member 40 is pivotally attached at its upper end to the inner end of throw arm 20 and pivotally attached at its lower end to the outer end of treadle extension 36. Attachment member 40 can be flexible, such as rope or cable, or rigid, such as a plastic or metal rod.

Figure 2:
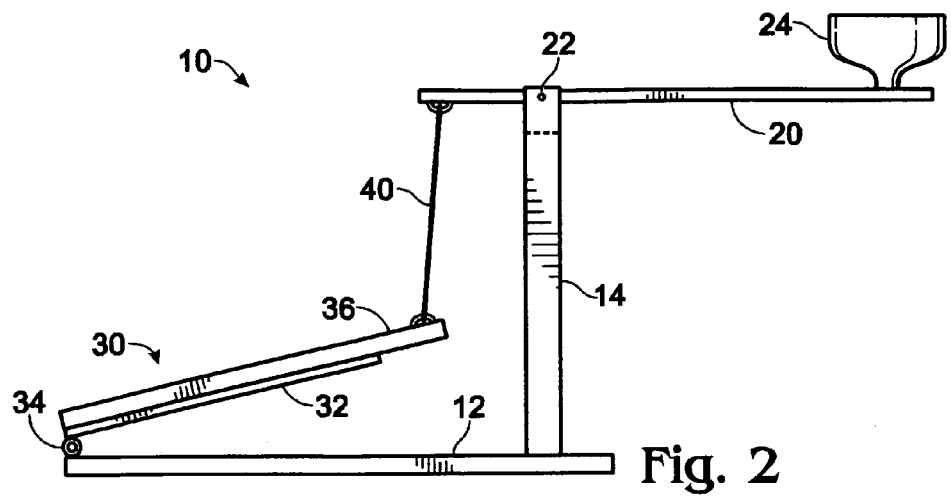
FIG. 2 is a side elevational view thereof, shown in its ready-to-use mode.
Figure 3:
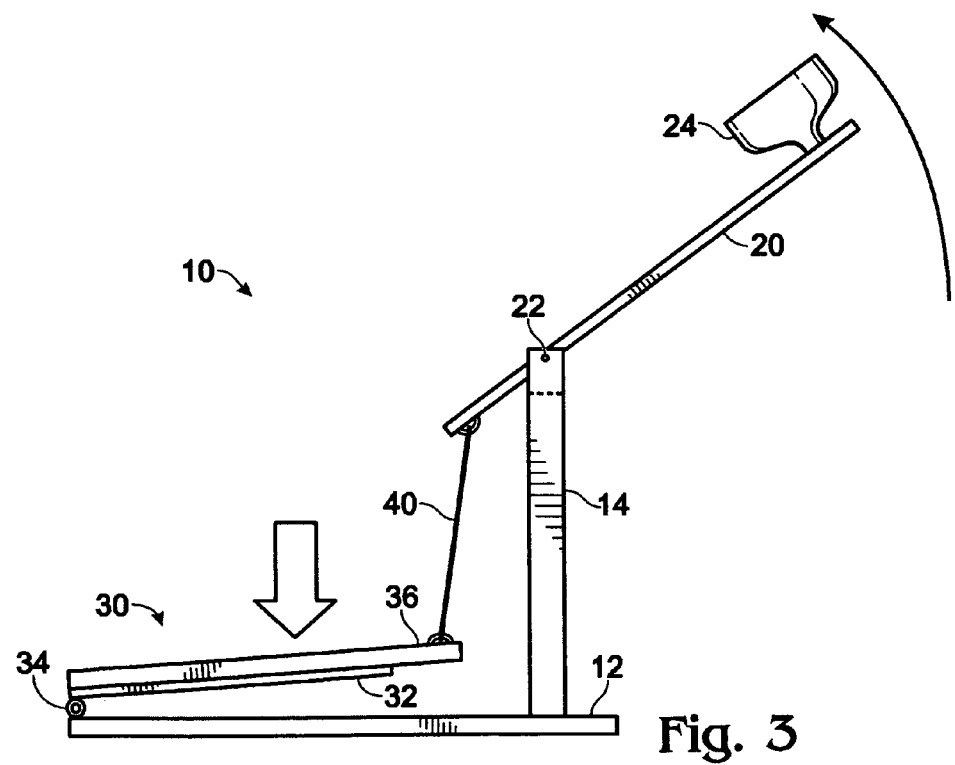
FIG. 3 is a side elevational view thereof, shown in of its ball ejection mode with its throw arm raised.

The relative lengths of the short and long portions of throw arm 20, together with the downwardly acting forces (weights) of ball receptacle 24 and treadle 30 are selected to cause the outer end of throw arm 20 and attached ball receptacle 24 to automatically move downwardly to the lowered, first positional mode shown in FIGS. 1 and 2 when device 10 is at rest. Upon depression of treadle 30 by a pet, a sufficiently large and rapid upward force acting on ball receptacle 24 causes it to move it rapidly upwardly to the raised, second positional mode shown in FIG. 3, thereby tossing the ball contained therein in an upward trajectory sufficiently high to allow the pet to chase and catch the ball on the fly.

Use of the pet operated ball throwing device 10 by a pet entails some initial training, but once the pet is trained to operate it, its use proceeds as follows. The pet, typically a dog, places a ball, preferably a light ball such as a tennis ball, into ball receptacle 24. At this juncture, the various elements of device 10 are in the ready-to-use, positional mode shown in FIGS. 1 and 2.

The pet then jumps onto the upper portion of treadle platform 32 thereby depressing it rapidly downwardly. Depression of the upper end of treadle platform 32 draws attachment member 40 and the inner end of throw arm 20 rapidly downwardly, thereby rapidly raising the outer end of throw arm 20 and receptacle 24 to the fully actuated ball ejection mode shown in FIG. 3. Such action causes the ball located within receptacle 24 to be tossed into the air where it can be chased and caught by the pet.

After having been actuated by the pet to toss the ball into the air, the device 10 automatically returns to the ready-to-use configuration shown in FIGS. 1 and 2. The pet then returns the retrieved ball to the device 10 and deposits it into receptacle 24. The pet can then repeat the ball tossing, catching, and return until it tires of the activity.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A pet operated ball thrower comprising:

a base;

a fulcrum post having lower end and an upper end, said fulcrum post being attached at said lower end thereof to said base;

a throw arm having an inner end and an outer end, said throw arm being pivotally attached at an attachment point to said fulcrum post adjacent the upper end of said fulcrum post to thereby form a first throw arm portion extending between said attachment point and the inner end of said throw arm and to form a second throw arm portion extending between said attachment point and the outer end of said throw arm;

a ball receiving receptacle attached to said second throw arm portion;

a treadle having a lower end and an upper end, said treadle being pivotally attached at said lower end thereof to said base; and an attachment member having a lower end and an upper end, said attachment member being pivotally attached at its lower end to said treadle adjacent said upper end of said treadle, said attachment member being pivotally attached at said upper end thereof to said first throw arm portion and, upon downward movement of said upper end of said treadle, adapted to rapidly pull downwardly said first throw arm portion to thereby cause said second throw arm portion and attached ball receiving receptacle to be moved from a lowered, first positional mode rapidly upwardly to a raised, second positional mode.

2. The ball thrower of claim 1 wherein said ball receiving receptacle is funnel-shaped.

3. The ball thrower of claim 1 wherein said attachment member is made of a flexible material.

4. The ball thrower of claim 3 wherein said attachment member is a rope or cable.

5. The ball thrower of claim 1 wherein said attachment member is made of a rigid material.

6. The ball thrower of claim 5 wherein said attachment member is a plastic or metal rod.

7. The ball thrower of claim 1 wherein the relative lengths of said inner and outer ends of said throw arm and the weight of said ball receptacle and treadle are selected so that said ball receiving receptacle is normally in its lowered, first positional mode.

* * * * *